Feb. 23, 1971  E. SIEMPELKAMP  3,565,725
APPARATUS FOR MAKING PRESSED BOARDS FROM PARTICULATE MATERIAL
Filed Jan. 31, 1968  2 Sheets-Sheet 1

Eugen Siempelkamp
INVENTOR.

BY Karl F. Ross
Attorney

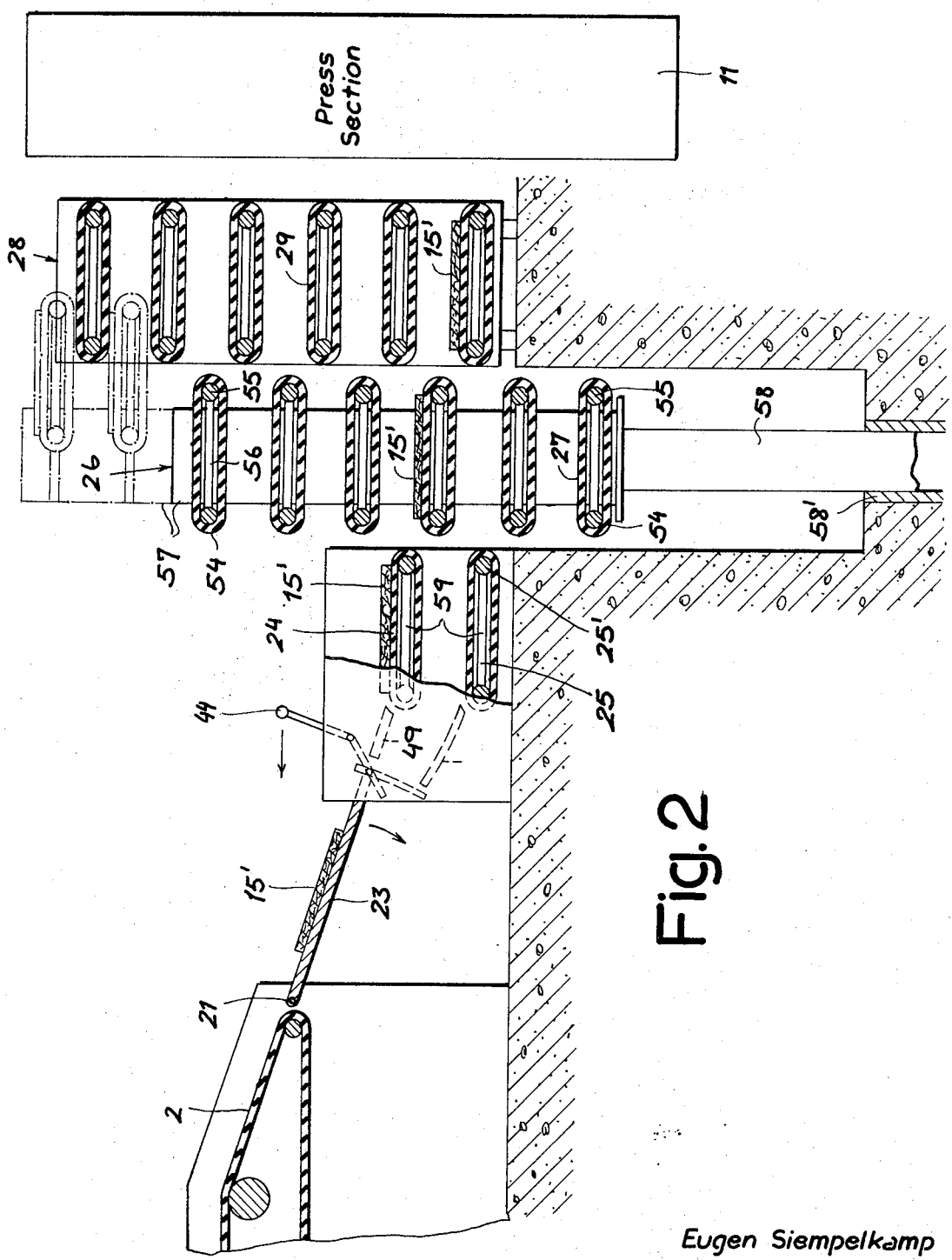

United States Patent Office 3,565,725
Patented Feb. 23, 1971

3,565,725
APPARATUS FOR MAKING PRESSED BOARDS
FROM PARTICULATE MATERIAL
Eugen Siempelkamp, 69 Hohenzollernstrasse,
415 Krefeld,. Rhineland, Germany
Continuation-in-part of application Ser. No. 458,228,
May 24, 1965. This application Jan. 31, 1968, Ser.
No. 702,026
Claims priority, application Germany, Jan. 31, 1967,
S 108,806
Int. Cl. B29f 5/08
U.S. Cl. 156—375                                      9 Claims

ABSTRACT OF THE DISCLOSURE

An installation for the production of press board in which a fiber layer is deposited upon a continuous operable conveyor surface and transferred, with separation into respective layer portions, to a second conveyor which is accelerated upon completion of the transfer of each portion and, in turn, feeds the layer portion to an intermediate stacking station in which the layers are stacked in a number of tiers equal to the numbers of levels of an adjoining press, the entire group of stack layers being introduced simultaneously into the press at intervals. The charging system operates continuously.

---

Figure 1:
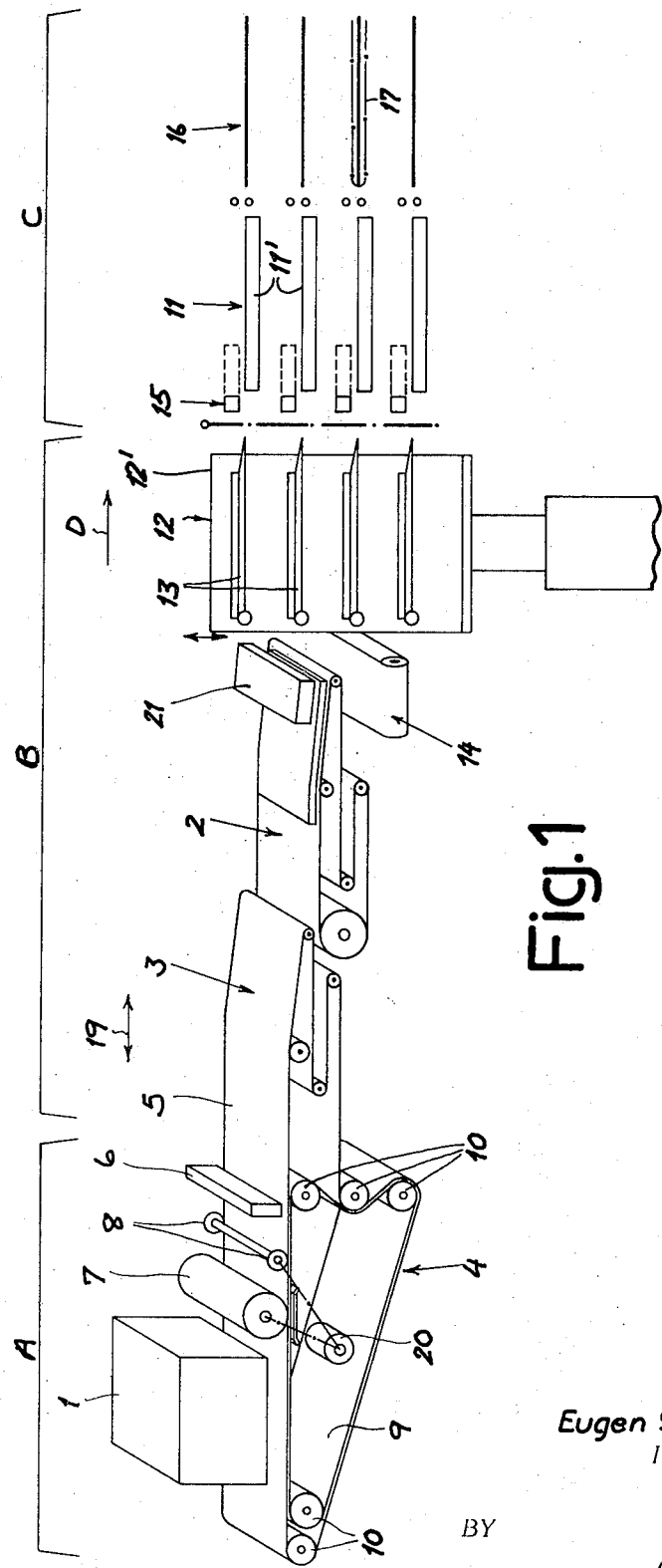

This application is a continuation-in-part of my copending application Ser. No. 458,228 filed May 24, 1965, now Pat. 3,428,505.

My present invention relates to a method for the production of pressed boards from comminuted and loosely coherent material as well as to an apparatus for carrying out this method.

In my earlier, now abandoned application Ser. No. 414,914, filed Nov. 30, 1964, I disclosed an arrangement for the serial production of pressed board and sheets from comminuted and generally fibrous material which may be admixed with or inherently contains a thermally activatable binder. For the most part this disclosed method and many prior-art techniques involved the dispensing of the comminuted material onto a surface to form a generally flat and, hopefully, uniform layer thereon, the surface being conveyed into a press. When charging plates are used, the equipment required to recirculate the plates to the dispensing station became inordinately complex, whereas the use of continuous bands required that these bands be brought to a standstill during the compression part of the stroke of the press. When reference is made hereinafter to "comminuted" material, it will be understood that any of the conventional substances generally employed for the manufacture of pressed board by compression of a layer of the material (i.e. with heating) are intended. The fibrous materials for this purpose are, for the most part, cellulosic and can be produced by comminuting wood (e.g. chip or sawdust formation, explosive expansion of wood fibers) or are the waste products of plants for the production of other materials.

The wood and other fibers can contain sufficient natural resins to render them coherent when the layer is pressed in the presence of heat although they will usually be admixed with thermoplastic or thermosetting resins (e.g. of the phenol-formaldehyde type), such resins constituting binders for the fibers. Depending upon the density of the product, the fibrous boards are designated as "hardboard" in which the resin proportion can be relatively high and which have a high-density and are sunbstantially fluid impermeable, and so-called "fiber-board" or relatively high porosity and correspondingly low density. The latter are excellent insulating materials whereas the former find their greatest utility as structural or wall-forming members. Boards of this general type include "fuller board" containing scrap-fabric fibers and wood fiber residues from the manufacture of paper or other industrial processes. The present invention is, therefore, concerned with all types of pressed-fiber boards wherein a noncoherent mass is compressed, usually concurrently with heating, to form a coherent plate-like structure.

As previously mentioned, the continuous or high-speed production of pressed board in installations having a dispensing station and a press has hitherto been limited by the fact that any conveyor means carrying the layer of limited coherent material to the press was required to operate only intermittently and hence the dispensing means was able only to function in a periodic manner. To increase production it had been proposed to shift the press or the dispensing station relatively to one another and the conveyor means. It has been suggested that the press, during the compression stroke, be movable with the conveyor which could then continuously receive the comminuted material from the stationary dispensing means; upon conclusion of this press stroke, however, the press was returned in the opposite direction. Others have suggested that a reciprocable dispensing station shift rearwardly with respect to the direction of feed of the layer while the conveyor means was immobilized during the stroke of the stationary press and then advanced when a further sheet was supplied thereto. In both cases the apparatus required for movably supporting the dispensing station and the press was inordinately complex, expensive and space consuming. Furthermore, the forward-and-back movement of the dispensing apparatus resulted in nonuniform distribution of the material in the layer and in pressed boards of nonuniform density. Thus it has not been possible heretofore to satisfactorily produce press boards in a plant at a high rate with both the dispensing station and the press substantially stationary.

My above-identified copending application discloses a method of operating a plant for the production of press boards wherein a layer of comminuted material is deposited upon a conveyor means at a stationary dispensing station and this layer is carried by the conveyor means into an intermittently operable and stationary press spaced from the dispensing station where the layer is compressed against the conveyor means; the improvement there, in its method aspects, then comprises the steps of driving a first portion of the conveyor means past the dispensing station at a substantially constant speed for continuous deposition of the comminuted material upon this first portion or first conveyor band to form the layer, intermittently driving a further portion of the conveyor means carrying the layer to carry it into the press whereby this further portion of the conveyor means may be inactivated during compression of the layer, and transferring the layer from the first portion of the conveyor means to this further portion without interrupting the continuous drive of this first portion.

This result is attained in accordance with this aspect of the invention by shifting the first portion or band of the conveyor means in the direction of displacement of the layer over a part of the further portion of the conveyor means and thereupon retracting the first portion to progressively place this layer upon the receiving part of the further portion of the conveyor means. Since the further portion of the conveyor means will generally include a band of steel or other metal against which the layer is compressed between the platens of the press and such bands are prone to wear and are relatively expensive, the receiving part of the further portion of the conveyor means can include an intermediate conveyor disposed between the continuously operable layer-forming first band and the steel compression band. Alternatively, a somewhat longer steel band can be employed with a portion thereof forming the receiving part. In all cases, it is an essential feature of the invention there described that the speed of the first band and the conveyor constituting the receiving part be synchronous (i.e. identical), so that upon transfer of the layer of sheet material, which is at most only limitedly coherent, there will be no tendency for the layer to be disrupted or distorted. It will be evident that this method of operating the plant permits both the dispensing station and the press to be stationary but nevertheless allows continuous operation of the dispensing means without the forward-and-back movement of the dispensing means hitherto required and without limitation of the dispensing operation by the compression time of the press.

The plant, according to another aspect of this invention, comprises a dispensing station designed to deposit a layer of fibrous material upon a first or layer-forming conveyor belt which is operated continuously and which is provided with a separating means for subdividing the layer into a plurality of sections corresponding generally to the individual boards to be produced. While the first conveyor is continuously operable, this separating means is preferably reciprocable along this conveyor so that during the separating operation it moves synchronously with the band but returns to its starting position upon conclusion of the separating operation.

According to a more specific feature of this invention, this first conveyor has a discharge extremity which can be retracted from its forward position overlying an intermediate conveyor or the steel band itself, this discharge extremity having a ramp swingable downwardly into proximity with the receiving part of the conveyor means for sliding the layer into this part. As described in the commonly assigned U.S. Pat. No. 3,224,758, the first conveyor belt may comprise a drive band engageable by the rollers and overlain by a relatively light layer-carrying band of fabric, resin or the like, the latter band passing over the ramp or discharge flap to ensure that there will be no frictional retardation of the layer as it is transferred from the first conveyor to the receiving part.

The receiving part may be intermittently operable at a relatively high speed by comparison with the transfer speed at which it is synchronized with the first conveyor; retraction of the first conveyor concurrently with its forward movement provides a net forward velocity at which the layer is advanced. During the forward movement of the conveyor, the band can then be slowed and correspondingly speeded up during retraction. Thus means can be provided, according to this invention, for driving the further portion of the conveyor means (i.e. the intermediate conveyor or the steel band itself) at a relatively high speed after the layer is deposited thereupon to separate the individual sections of the layer from one another at a high rate. Thus the further conveyor means can be accelerated to a speed several times that at which the layer is transferred from the first portion to the further portion.

In summary, therefore, my copending application Ser. No. 458,228, filed May 24, 1965, now Pat. 3,428,505 discloses an arrangement for the serial production of pressed boards and sheets from comminuted and generally fibrous material in which layers of the material are deposited upon a conveyor means at a continuously operating dispensing station, subdivided by a separating means into a plurality of sections, and transported on a conveyor means to a press, spaced away from the dispensing station, where the loosely coherent material is compressed against the conveyor means and formed into compact sheets. The conveyor means, according to the specification, consists of two portions of which the first is driven past the dispensing station at a substantially constant speed for the continuous deposition of the comminuted material, whereas the second portion, carying the layers to the press, operates intermittently since it must come to a standstill during the compaction process of the press. The transfer of the layers of deposited material from the first to the second portion of the conveyor means is effected without distortion of the layers, and without interruption of the continuous drive of the first portion of the conveyor means.

A drawback of this arrangement is that the successive arrival of individual sections of loosely coherent material at the press makes it impractical to use a multiplate press and thus severely limits the output.

Another disadvantage is that the conveyor means, passing through the press, is subjected to considerable wear and tear by the repeated compression of the layers against its body.

It is, therefore, the principal object of my present invention to overcome these disadvantages and to provide an improved installation for the production of pressed boards which extends the principles originally set forth in my aforementioned copending application.

Another object is to increase the productivity of the installation by introducing a multiplaten or multilevel press.

Still another object is to keep the conveyor means away from the press mechanism and thus to avoid damage and deterioration of the conveyor belt.

These and other objects of my present invention which will be apparent hereinafter, are attained, in accordance with the present invention, by adding an intermediate transfer means, to be installed between the second portion of the coveyor means referred to and generally designated as the primary conveyor, and the press. The intermediate transfer means, according to one embodiment of my invention, is of the kind fully described in U.S. Pat. No. 3,077,271, issued to me on Feb. 12, 1963, whereby the layers of deposited material are transferred from the second portion of the primary conveyor means to charging trays carried by a multilevel truck. The truck is then moved to a charging position, where the trays and the layers thereon are placed on the anvil of a multilevel press for compression to the final thickness of the sheets, and thence to a discharging position, where the trays with the compressed sheets are returned to the truck, preparatorily to the unloading of the sheets from the trays of the truck for further processing or discharge from the plant.

Similar intermediate transfer methods of this general type, including band and/or tray transfer methods, have also been described in U.S. Pat. No. 3,050,200, granted to me on Aug. 21, 1962 and in U.S. Pat. No. 3,288,057 issued on Nov. 29, 1966 to Kurt Loewenfeld. (See also commonly assigned copending applications Ser. No. 531,234 of Mar. 14, 1966, now Pat. 3,379,322. Ser. No. 534,324 of Mar. 15, 1966 and Ser. No. 545,340 of Apr. 26, 1966, now Pat. 3,379,124.)

The interposition of a secondary transfer means permits the continuous charging of the press, without the interruptions due to the compaction periods. The variable speed of the second portion of the primary conveyor, which changes from a relatively slow speed synchronized with the speed of the first portion, to a high speed on the reciprocating stroke, makes it possible to charge the press at a consistently higher average speed.

The transfer of the layers between the various conveyor means and from the conveyor means to the press may be effected by a variety of methods. For example, the inertia of the moving material may carry it over the separating gap to the proximate surface when the conveyor means on which it rests is suddenly stopped or is made to reverse the direction of its motion. In another embodiment the material may be directed onto a swinging platform or chute whose inclination is greater than the angle of friction of the layers of material on its surface.

The above and other objects, features and advantages of the present invention will become more readily apparent from the following description, reference being made to the accompanying drawing in which:

FIG. 1 is a somewhat diagrammatic side-elevational view showing an installation for producing pressed boards in accordance with my invention; and FIG. 2 is a side-elevational view of a portion of the installation.

In FIG. 1 I show a schematic layout of a plant for the production of pressed boards for the purpose of illustrating the movement of the layers of material through the several stages of its manufacture according to my present invention.

The plant comprises a rough-forming section A, a conveyor section B and a press section C. The rough-forming section comprises the dispensing station 1 (see U.S. Pat. No. 3,282,767) at which the comminuted material is deposited upon the band 5 of the first conveyor portion 4 of the primary conveyor means; the layer of fiber or chip particles passes next under the rotating drum (see U.S. Pat. No. 3,096,227) of a rolling press 7 where the mass is roughly pressed to form a loosely coherent layer. A pair of lateral trimmers 8 (see U.S. Pat. No. 3,051,219) straighten the sides of the layers parallel to the band, while separating means 6 (e.g. a saw arrangement as shown in my application Ser. No. 458,228, now Pat. 3,428,505 or U.S. Pats. 3,051,219 and 3,096,227) sever the layer into discrete sections to form respective sheets after compression.

The dispensing station 1 may be any conventional device for metering comminuted material, for example, a rotary drum dispenser, a vibrating shutter dispenser and the like, as outlined in the above-cited co-pending application. The rolling press 7 and the lateral trimmers 8 are driven by the motor 20. The operation of the separating means 6 which is shiftable in the direction of the arrow 19, is fully described in the above-cited co-pending application.

The first portion 4 of the primary conveyor means may be identical with that described in U.S. Pat. 3,224,758, issued to me on Dec. 21, 1965 and comprises support rollers 10 which engage the drive band 9 with its overlaid light inextensible layer-carrying band 5 which may consist of fabric, synthetic resin or the like.

The second portion 2 of the primary conveyor means corresponds to the output side of the primary conveyor described in my co-pending application Ser. No. 458,228, now Pat. 3,428,505, conveyors 2 and 3 being synchronized as there described. The layers are scanned at a quality control station 21 at the discharge end of the second portion 2 of the primary conveyor means, and the rejection and subsequent removal of faulty layer is effected by way of a transverse conveyor 14 running perpendicular to the plane of the drawing.

The intermediate transfer means 12, another embodiment of which is shown in detail in FIG. 2, can comprise the platform 23 swingable about the pivot 22 to direct incoming layers of the material onto the outgoing conveyors 24 and 25, an elevatable conveyor rack 26, and a stationary rack 28.

The intermediate station 12, at which the fiber layers are stacked prior to simultaneous introduction of a number of them into the press, may be constituted in various ways in accordance with disclosures in my prior patents copending applications and the commonly assigned applications mentioned earlier. Thus, the conveyor 2 may deposit the sheets successively upon the rack 12 which may be raised and lowered by hydraulic means as shown in FIG. 2, the swingable platform 23 and the intermediate conveyors 24 and 25 being omitted in this case. The platforms 13 of the intermediate conveyors may themselves be so-called "conveyor-band tablets" which rotate while being withdrawn (see subsequent discussion of FIG. 2), to deposit the layers upon the platens 11' of the press. Alternatively, the platforms 13 may merely be shiftable in the direction of arrow D, once the frame 12' in which they are mounted is fully loaded, the platforms 13 the overlying plates 11'. Strippers 15 then drop down behind the layers (see the commonly assigned copending applications Ser. No. 534,324, now Pat. 3,379,322 and Ser. No. 545,341, now Pat. 3,338,486) to retain the layers while the platforms 13 are withdrawn in the opposite direction.

Still another modification of the intermediate stage may provide for transfer of the layers onto a rack which is elevatable and lowerable, via a stationary guide and an elevatable platform assuring alignment between the layers and the platens. Structure of this nature is fully described and illustrated in the commonly assigned copending application Ser. No. 534,231, now Pat. 3,389,652. The final conveyor stage 2 of FIG. 1 may form the conveyor carrying the layers to the stacking assembly shown in this latter application.

The multiplaten press 11 is preferably of the type commonly assigned U.S. Pats. 3,050,777 and 3,209,405; the conveyors 2 and 3 (FIG. 1) may be synchronized by the control means described and illustrated in my copending application Ser. No. 458,228, now Pat. 3,428,505 or in U.S. Pat. No. 3,133,386.

The multiplaten press 11 may be provided with strippers 15 which retain the plates and feed them to a discharge means 16, comprising individual bands or trays 17 for the withdrawal of the finished sheets.

In operation, the material dispensed by the station 1 onto the band 5 is roughly compressed by the roller 7, trimmed by the pair of trimmer plates 8 and divided by the separating means 6 into discrete sections. It passes along the discharge ramp 3 of the first portion 4 of the primary conveyor means and is transferred across the gap separating the first and the second portion of this conveyor means while both portions are driven at synchronized speed, the discharge end of the first conveyor and the introduction end of the second conveyor being displaced during this period as soon as the transfer of a layer to the second portion 2 is complete, the second portion is accelerated in the direction toward the intermediate transfer means 12, to deliver the deposited layer at a speed substantially greater than that at which it was received from the first portion 4. On the return trip the second portion 2 of the conveyor means is decelerated, preparatory to receiving the next layer at an essentially slower speed.

The layer 15' is transferred from the discharge ramp of the conveyor means 2 across a narrow gap onto the swingable platform 23 and is directed downward onto the outgoing conveyor 24 by way of a stationary platform 49. As soon as one layer 15' has left platform 23, but before the leading edge of the next layer has reached the end of the platform, the latter is swung about the pivot 22 by means of lever 44 into the position shown in the dot-dash lines, thereby causing the next layer 15' to be directed onto conveyor 24. The speed of conveyors 24 and 25 is substantially greater than that of the conveyor means 2.

The layers 15' are transferred from the conveyor belts 24 and 25 to the elevatable conveyor rack 26. The transfer rack 26 carries conveyor belts 27, each of them supported on a pair of rollers 54, 55 journaled into a pair of cross-bars 56. The cross-bars 56 are slidable within appropriate channels provided in a pair of posts 57 of which only one is shown. The entire rack 26 is mounted upon a hydraulic piston 58 which may be raised and lowered within a conventional hydraulic cylinder 58' actuated by a fluid source (not shown).

The layers 15' may be placed upon rack 26 by positioning the conveyor belt 24 or 25 carrying a layer partially above one of the belts 27 and then rotating the belt 25 clockwise while withdrawing the conveyor unit 25, 25' and 59, thus depositing the layer 15' upon belt 27.

As soon as a layer 15' has been deposited upon conveyor belt 24, the platform 23 is swung downwardly to place the next sheet upon conveyor 25; concurrently therewith, conveyor belt 24 deposits its load upon one of the belts 27 of rack 26 as described above, which then receives a load from conveyor 24 while belt 24 is being reloaded. The rack 26 is raised by hydraulic piston 58 to present an empty conveyor belt 27 to the belts 24, 25, as each returns with a new load. When rack 26 is fully loaded, it rises alongside the stationary rack 28 in staggered relationship therewith so that the layers 15' on rack 26 can now be transferred to the belts 29 of rack 28 in the same manner as the transfer of layers from belts 24 and 25 to belts 27 had been accomplished. This operation, illustrated in dot-dash lines in FIG. 2, may proceed simultaneously for all the belts 27 and 29. The rack 26 is then lowered for the repetition of the process, while the stacked layers are stored upon stationary rack 28 prior to further processing in the press section 11 as fully described in U.S. Pat. 3,050,777, issued to me on Aug. 28, 1962. Discharge of the finished layers is effected in the multi-level rack 16 which receives the compressed sheets from the press in individual trays 17 and holds them for an intermediate period or for unloading onto transfer means for further processing or shipping.

The invention described and illustrated is believed to admit of many modifications within the ability of persons skilled in the art, all such modifications being considered within the spirit and scope of the appended claims.

I claim:

1. An apparatus for the production of pressed board comprising:
   a first conveyor defining a transport path for a succession of layers of comminuted material;
   dispensing means forming a succession of layers on said first conveyor;
   a second conveyor receiving successive layers from said first conveyor and generally aligned therewith while being reciprocable in the direction of displacement of said layers and being operable at a relatively low speed equal to that of said first conveyor to receive said layers from said first conveyor and at a relatively high speed to dispense said layers concurrently with retraction of said second conveyor;
   a multiplaten press having a plurality of levels ahead of said second conveyor for receiving the layers successively deposited thereby; and a stacking station between said second conveyor and said multiplaten press, said stacking station having a plurality of tiers equal in number to the levels of said press and successively receiving said layers from said second conveyor, said first conveyor having a discharge end shiftable synchronously with the receiving end of said second conveyor and juxtaposed therewith during transfer of said layers from said first conveyor to said second conveyor.

2. An apparatus as defined in claim 1 wherein said stacking station is an elevatable and lowerable rack, said second conveyor feeding said layers directly onto the tiers of said rack.

3. An apparatus as defined in claim 1 further comprising compacting means along said first conveyor for shaping said layers into loosely coherent mats, lateral trimmer means for shaping lateral edges of said mats and separating means for separating said layers from one another.

4. An apparatus as defined in claim 1 wherein each of said tiers is a conveyor band.

5. An apparatus as defined in claim 1 wherein said stacking station includes at least one tiltable platform for transferring said layer from said second conveyor to the tiers.

6. An apparatus as defined in claim 5 further comprising a storage conveyor intermediate said tiltable platform and said tiers for temporarily retaining said layers prior to deposition of said layers on the tiers.

7. An apparatus as defined in claim 1 wherein each of said tiers is constituted as a reciprocable surface shiftable into and withdrawable from said press above the respective platens.

8. An apparatus as defined in claim 7 further comprising stripper means for retaining said layers upon advance of said reciprocable surfaces into said press and during withdrawal thereof, thereby depositing said layers in said press.

9. An apparatus for producing pressed board, comprising a first conveyor belt defining a transport path for a succession of layers of comminuted material and having a discharge end at a downstream portion of said transport path; means for deposition of said layer on said first conveyor belt up-stream of said end; a second conveyor belt downstream of said first conveyor belt and having a receiving end juxtaposed with said discharge end of said first conveyor belt for receiving said layers in succession therefrom, said second conveyor belt being provided with a discharge end having means for stacking said layers at a plurality of levels; two-speed drive means connected to said second conveyor belt for operating same at a relatively low speed equal to that of said first conveyor belt for transfer of a layer from said first conveyor belt to said second conveyor belt and at a relatively high speed for discharge of said layers from said second conveyor belt; and a multiplaten press down-stream of said second conveyor belt for receiving said layers at said levels and compressing them in common to produce pressed board, said first conveyor having a discharge end shiftable synchronously with the receiving end of said second conveyor and juxtaposed therewith during transfer of said layers from said first conveyor to said second conveyor.

References Cited

UNITED STATES PATENTS

| | | | |
|---|---|---|---|
| 2,127,278 | 8/1938 | Welch | 214—16.6 |
| 2,693,135 | 11/1954 | Frost | 214—16.6 |
| 2,732,085 | 1/1956 | Siempelkamp | 214—16.6 |
| 2,775,787 | 1/1957 | Krag | 214—16.6X |
| 2,878,728 | 3/1959 | Clark | 100—198X |
| 3,050,200 | 8/1962 | Siempelkamp | 214—16.6 |
| 3,051,219 | 8/1962 | Kaiser | 156—375 |
| 3,077,271 | 2/1963 | Siempelkamp | 214—16.6 |
| 3,133,386 | 5/1964 | Johnston | 53—26 |
| 3,282,367 | 11/1966 | Greten | 156—373 |
| 3,288,057 | 11/1966 | Loewenfeld | 100—198 |
| 3,332,819 | 7/1967 | Siempelkamp | 156—375 |
| 3,339,757 | 9/1967 | Nagaoka | 100—196X |
| 3,353,690 | 11/1967 | Nagaoka | 214—16.6 |
| 3,372,217 | 3/1968 | Paerels et al. | 214—16.6X |

JOHN T. GOOLKASIAN, Primary Examiner

W. E. HOAG, Assistant Examiner

U.S. Cl. X.R.

100—198, 215, 218; 156—369; 198—76, 94, 102, 106; 214—16.6